(12) United States Patent
Spurling et al.

(10) Patent No.: US 10,596,893 B2
(45) Date of Patent: Mar. 24, 2020

(54) TRANSMISSION ROLL INITIATOR

(71) Applicant: Ford Global Technologies, LLC, Dearborn, MI (US)

(72) Inventors: Michael Spurling, Romford (GB); Daniel Meckenstock, Wuppertal (DE); Marius Sawatzki, Pulheim (DE); Simon Jesse, Braintree (GB); Herbert Gonska, Merkenich (DE); Dongpeng Kou, Nanjing (CN); Wayne Vinh Lam, Werribee (AU)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/244,782

(22) Filed: Jan. 10, 2019

(65) Prior Publication Data

US 2019/0210444 A1     Jul. 11, 2019

(30) Foreign Application Priority Data

Jan. 10, 2018  (GB) .................................. 1800397.0

(51) Int. Cl.
*B62D 21/11*  (2006.01)
*B60K 5/12*   (2006.01)
*B60K 17/08*  (2006.01)

(52) U.S. Cl.
CPC ............ *B60K 5/1208* (2013.01); *B60K 5/12* (2013.01); *B60K 17/08* (2013.01); *B62D 21/11* (2013.01)

(58) Field of Classification Search
CPC .... B62D 21/152; B62D 21/155; B62D 21/15; B60R 19/54

USPC .................................................. 180/346, 232
See application file for complete search history.

(56) References Cited

U.S. PATENT DOCUMENTS

| | | | | |
|---|---|---|---|---|
| 5,740,876 A * | 4/1998 | Shimose | .............. | B60K 5/1216 180/232 |
| 5,947,223 A * | 9/1999 | Rebmann | ................ | B60R 21/00 180/232 |
| 5,992,555 A * | 11/1999 | Sakamoto | ............ | B60K 5/1216 180/232 |
| 6,213,245 B1 * | 4/2001 | Murata | .................. | B60K 17/00 180/312 |
| 6,394,215 B1 * | 5/2002 | Masuda | ................. | B60K 17/24 180/232 |
| 6,478,106 B2 * | 11/2002 | Hawener | ................ | B62D 21/11 180/232 |
| 6,761,242 B2 * | 7/2004 | Yoshida | .................... | B60K 5/12 180/232 |
| 7,392,782 B2 * | 7/2008 | Fujii | ................ | F02M 35/10144 123/195 C |

(Continued)

FOREIGN PATENT DOCUMENTS

| | | |
|---|---|---|
| DE | 102016109857 | 11/2017 |
| GB | 2448826 | 10/2008 |

*Primary Examiner* — Jeffrey J Restifo
(74) *Attorney, Agent, or Firm* — Burris Law, PLLC (57) ABSTRACT

A vehicle transmission apparatus, for an automotive vehicle that has a longitudinal axis and a lateral axis, is contained within an engine compartment of the vehicle and includes a vehicle transmission and a roll initiator operable to rotate the vehicle transmission about the lateral axis of the vehicle. The roll initiator is attached to vehicle transmission and has a projecting portion that is arranged to engage with a structure within the engine compartment.

20 Claims, 5 Drawing Sheets

(56) References Cited

U.S. PATENT DOCUMENTS

| | | | | |
|---|---|---|---|---|
| 7,393,016 B2* | 7/2008 | Mitsui | B62D 25/08 | 180/232 |
| 7,669,688 B2* | 3/2010 | Yamaguchi | B62D 21/152 | 180/232 |
| 7,997,366 B2* | 8/2011 | Tanaka | B60K 13/02 | 180/232 |
| 8,122,992 B2* | 2/2012 | Inoue | B62J 27/00 | 180/232 |
| 8,646,790 B2* | 2/2014 | Young | B62D 21/15 | 280/124.109 |
| 8,807,597 B2* | 8/2014 | Akaki | B62D 21/02 | 180/232 |
| 8,851,223 B2* | 10/2014 | Yamashita | B62D 21/155 | 180/291 |
| 9,016,768 B2* | 4/2015 | Makino | B62D 21/155 | 296/187.1 |
| 9,022,457 B2* | 5/2015 | Hirano | B60K 1/00 | 296/187.03 |
| 9,180,828 B2* | 11/2015 | Sakakibara | B60R 19/34 | |
| 9,180,913 B2* | 11/2015 | Ameloot | B62D 21/155 | |
| 9,199,669 B2* | 12/2015 | Jones | B62D 25/082 | |
| 9,415,805 B2* | 8/2016 | Fujikawa | B62D 25/082 | |
| 9,545,951 B2* | 1/2017 | Ono | B62D 21/11 | |
| 9,644,583 B2* | 5/2017 | Ishiki | F02M 37/0017 | |
| 9,676,417 B2* | 6/2017 | Yamada | B60R 19/24 | |
| 10,035,415 B1* | 7/2018 | Koch | B60K 15/01 | |
| 10,246,132 B2* | 4/2019 | Leier | B60K 1/00 | |
| 10,407,100 B2* | 9/2019 | Onoda | B62D 21/03 | |
| 2002/0096384 A1* | 7/2002 | Yoshida | B60K 5/12 | 180/298 |
| 2003/0011184 A1* | 1/2003 | Sonomura | B60K 5/1216 | 280/784 |

* cited by examiner

TRANSMISSION ROLL INITIATOR

CROSS-REFERENCE TO RELATED APPLICATIONS

This application claims priority to and the benefit of United Kingdom Application 1800397.0 filed on Jan. 10, 2018. The disclosure of the above application is incorporated herein by reference.

FIELD

The present disclosure relates to a roll initiator for a vehicle transmission.

BACKGROUND

The statements in this section merely provide background information related to the present disclosure and may not constitute prior art.

In modern motor vehicles, engine compartments are designed to minimize intrusion of engine components into the passenger compartment in the event of a crash to improve vehicle crashworthiness and passenger safety. A major aspect of such design is the consideration of which engine components may directly contact the dashboard panel (or 'dash panel', as it is commonly known in the art) cross member in the event of a frontal collision of the vehicle.

In prior art vehicles incorporating manual or automatic transmissions it has been possible to prevent dash panel intrusion into the passenger compartment by placing energy absorbing elements between the transmission and the dash panel cross member. This has been possible because the shape of manual and automatic transmissions allows a space for such elements. Said space also translates to increased time during a crash event for energy to be dissipated from the transmission as it transits said space.

However, it has been found that this is difficult to achieve in vehicles incorporating a continuously variable transmission (CVT). The shape of a CVT differs from that of a manual or automatic transmission in that the CVT has a rearward projection (a so-called 'hunchback' region) which eliminates the space referred to above. Hybrid electric transmissions also exhibit a similar hunchback region. This and other issues are addressed by the present disclosure.

SUMMARY

In accordance with a first form of the present disclosure, there is provided a vehicle transmission apparatus for an automotive vehicle having a longitudinal axis and a lateral axis. The vehicle transmission apparatus is contained within an engine compartment of the vehicle and includes a vehicle transmission and a roll initiator having a projecting portion. The projecting portion is arranged to engage with a structure within the engine compartment to rotate the vehicle transmission about the vehicle lateral axis when the vehicle undergoes a collision in the longitudinal direction.

This configuration allows a rear portion of the transmission to rotate downwards during a collision and push under the dash panel cross member. This can act to reduce or inhibit dash panel intrusion into the vehicle passenger compartment.

The projecting portion of the roll initiator may be aligned with a bumper beam of the vehicle. This arrangement provides a direct path for the transmission of force from a colliding vehicle to the roll initiator during a crash since a bumper of the vehicle is the most likely component to first be struck during a collision. Accordingly, the supporting bumper beam is likely to provide a reliable load path to induce the necessary load to the projecting portion of the roll initiator. In one form, the force is transmitted to the roll initiator as early on in a collision as possible, as this gives more time for the hunchback region to rotate. More time corresponds to a greater extent of rotation of the hunchback region, which increases the likelihood of the hunchback region being rotated underneath the dash panel cross member.

A rear surface of the roll initiator may comprise a portion corresponding in shape to an outer surface of the vehicle transmission. This construction increases the contact surface area between the roll initiator and the vehicle transmission, which provides an efficient transmission of force between the roll initiator and the vehicle transmission during a collision.

The roll initiator may comprise a hook portion configured to engage with a portion of the vehicle transmission to inhibit separation of the roll initiator from the vehicle transmission.

The roll initiator and vehicle transmission may each comprise corresponding interlocking portions configured to inhibit separation of the roll initiator from the vehicle transmission. This arrangement provides many points of contact between the roll initiator and the vehicle transmission, which allows the efficient transmission of load between the projecting portion of the roll initiator and the rear surface of the roll initiator.

Each of the above arrangements (form-fitting rear surface, hook portion and interlocking arrangement) may be used separately or in conjunction with one another. Each arrangement improve the strength of the connection such that the use of fasteners to connect the roll initiator to the vehicle transmission (e.g. bolts) do not need to be relied on to provide strength of connection. This in turn means that lower strength, and more affordable fasteners can be used to connect the roll initiator to the vehicle transmission, which in turn lowers the cost of installation.

The projecting portion may comprise one or more reinforcing ribs. The ribs inhibit the projecting portion from simply collapsing during a collision and also allow the force experienced by the projecting portion during a collision to be spread evenly across the rear surface of the roll initiator.

The transmission may be a continuously variable transmission. While the roll initiator of the present disclosure may act to rotate any type of vehicle transmission, it is particularly efficacious in inhibiting dash panel intrusion into the vehicle passenger compartment where the vehicle transmission is a continuously variable transmission, as these types of transmission typically comprise a hunchback region. This configuration provides the hunchback region of the CVT to rotate downwards during a collision and push under the dash panel cross member. This can act to reduce or inhibit dash panel intrusion into the vehicle passenger compartment that would normally occur as a result of the hunchback region directly contacting the dash panel cross member during a collision.

The transmission may be a continuously variable transmission. As noted above, hybrid electric transmissions also exhibit a hunchback region, and so the roll initiator of the present disclosure is also particularly efficacious in inhibiting dash panel intrusion into the vehicle passenger compartment where the vehicle transmission is a hybrid electric transmission.

Furthermore, according to the present disclosure there is provided roll initiator for use in the transmission set out above.

Moreover, according to the present disclosure there is provided a method of modifying a vehicle transmission for an automotive vehicle having a longitudinal axis and a lateral axis. The vehicle transmission is contained within an engine compartment of the vehicle. The method comprising the step of: attaching a roll initiator to the vehicle transmission. The roll initiator comprises a projecting portion arranged to engage with a structure within the engine compartment to rotate the vehicle transmission about the vehicle lateral axis when the vehicle undergoes a collision in the longitudinal direction.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
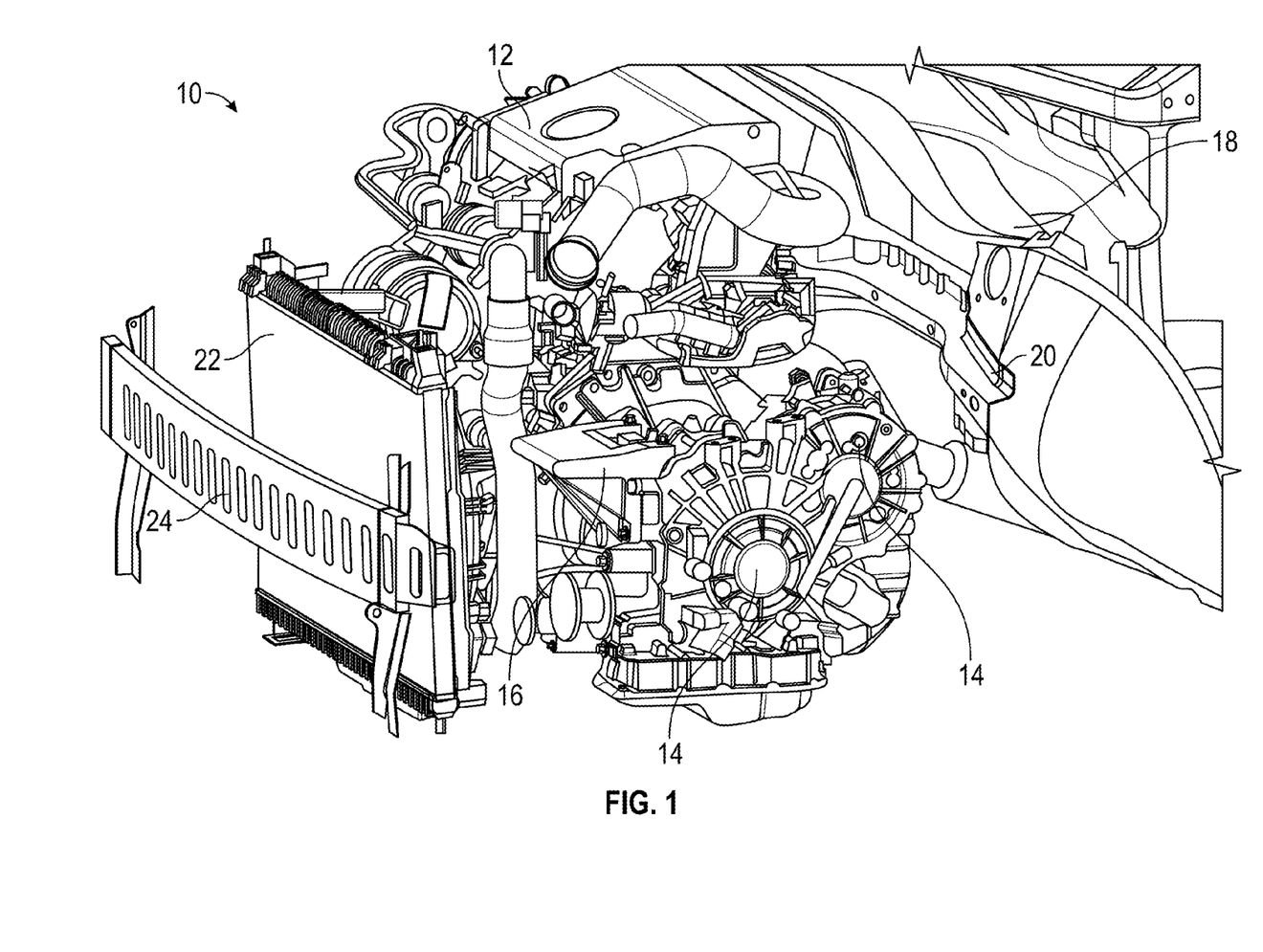
FIG. 1 is a perspective view of a vehicle transmission according to the teachings of the present disclosure.

FIG. 1 schematically shows a perspective view of a vehicle transmission according to the present disclosure.

A vehicle engine compartment is generally indicated by reference numeral 10. Some components of the engine compartment have been omitted so that the positional relationships between components relevant to the present disclosure can be clearly seen.

The engine compartment 10 contains an engine 12. The engine 12 transmits power to the wheels (not shown) of the vehicle via a transmission 14. In FIG. 1, the transmission 14 is a continuously variable transmission (CVT). When compared to many manual or automatic transmissions, CVTs have a region projecting from a rearward (relative to the vehicle) portion thereof, which is sometimes referred to as a 'hunchback' region. The hunchback region of the transmission 14 shown in FIG. 1 is indicated in dotted lines with the reference letter H.

The transmission 14 has a roll initiator 16 attached to a forward (relative to the vehicle) surface thereof. The transmission 14 and the roll initiator 16 may be collectively referred to as a vehicle transmission apparatus.

Further components of the engine compartment 10 include a dash panel 18, a dash panel cross member 20, a cooling pack 22 and a bumper beam 24. These components are standard components and are generally known in the automotive field.

Figure 2A:
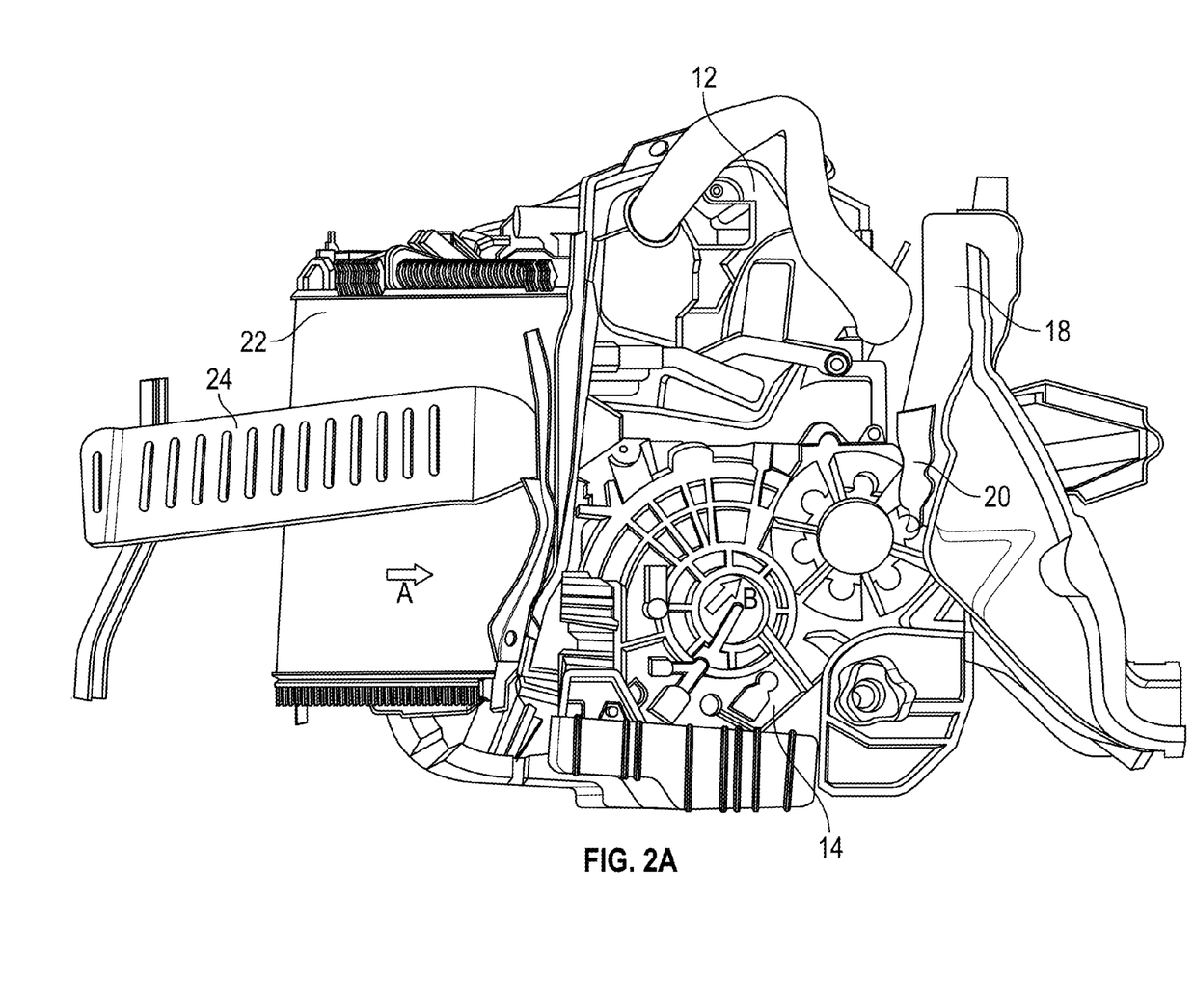
FIGS. 2A and 2B illustrate the movement of the vehicle transmission of FIG. 1 without the roll initiator and with the roll initiator respectively.

FIG. 2A schematically shows the movement of the vehicle transmission of FIG. 1 without the roll initiator. Like reference numerals have been retained as appropriate.

In FIG. 2A, the vehicle has experienced a collision from the front of the vehicle. The direction of the force is indicated by arrow A. The bumper beam 24 has been forced back in a rearward direction and has contacted the cooling pack 22, which has likewise been forced in a rearward direction.

It can be seen that in the absence of the roll initiator 16, the cooling pack 22 contacts the engine and the transmission 14 substantially simultaneously. The cooling pack 22 comprises a planar rear surface. A majority of this planar surface may push the engine 12 and the transmission 14 rearward substantially along the longitudinal axis of the vehicle.

The hunchback region of the transmission 14 is in close proximity to the dash panel cross member 20. As a result, rearward longitudinal movement of the transmission 14 may bring the hunchback region into direct contact with the dash panel cross member 20 very quickly following the application of collision force to the front of the vehicle. The dash panel cross member 20 is attached to the dash panel 18 and so the collision force is transmitted from the dash panel cross member 20 to the dash panel 18. As a result, the dash panel may be pushed into the passenger compartment of the vehicle (e.g. into the foot well).

In the example illustration of FIG. 2A, a direct load path through engine compartment components, indicated by arrow B, can be established very early on in a collision event. This can cause forces from the front of the vehicle to be transmitted to the passenger compartment. It is desirable to inhibit or delay the establishment of such a direct load path.

Figure 2B:
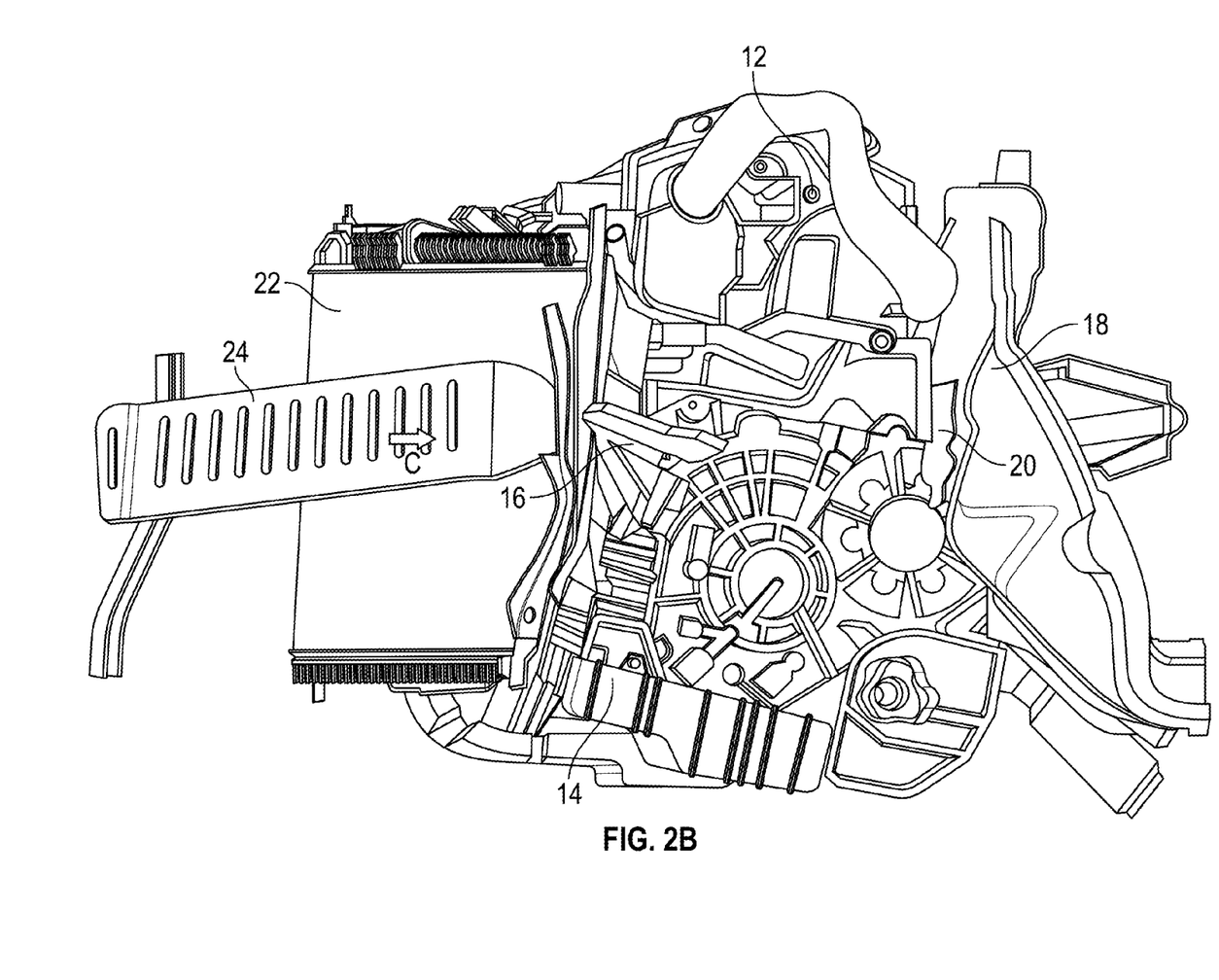

In one form, FIG. 2B illustrates the movement of the vehicle transmission of FIG. 1 with the roll initiator. Like reference numerals have been retained as appropriate.

In FIG. 2B, the vehicle has experienced a collision from the front of the vehicle. The bumper beam 24 has been forced back in a rearward direction and has contacted the cooling pack 22, which has likewise been forced in a rearward direction.

However, unlike the arrangement shown in FIG. 2A, instead of the cooling pack 22 contacting the engine 12 and transmission 14, in FIG. 2B the cooling pack 22 first contacts a projecting portion of the roll initiator 16. The roll initiator 16 is attached to the transmission 14 at a point above the centre of mass of the transmission 14, i.e. the roll initiator is eccentrically mounted. As a result, contact between the cooling pack 22 and the roll initiator 16 transmits a force to the transmission 14 that imparts a rotation to the transmission 14. The direction of rotation is indicated by arrow D.

As the cooling pack 22 is forced further rearward, the engine 12 and transmission 14 are also forced rearward, as they were in FIG. 2A. However, as the transmission 14 has been rotated in the direction of arrow D (i.e. substantially about a lateral axis of the vehicle), the hunchback region of the transmission 14 has moved downward away from the dash panel cross member 20. The load path established is indicated by arrow E, and it can be seen by the direction of arrow E that the force is not being transmitted directly to the dash panel cross member 20 but downwardly away from the dash panel cross member 20. This reduces the intrusion of the dash panel 18 into the passenger compartment of the vehicle.

Figure 3A:
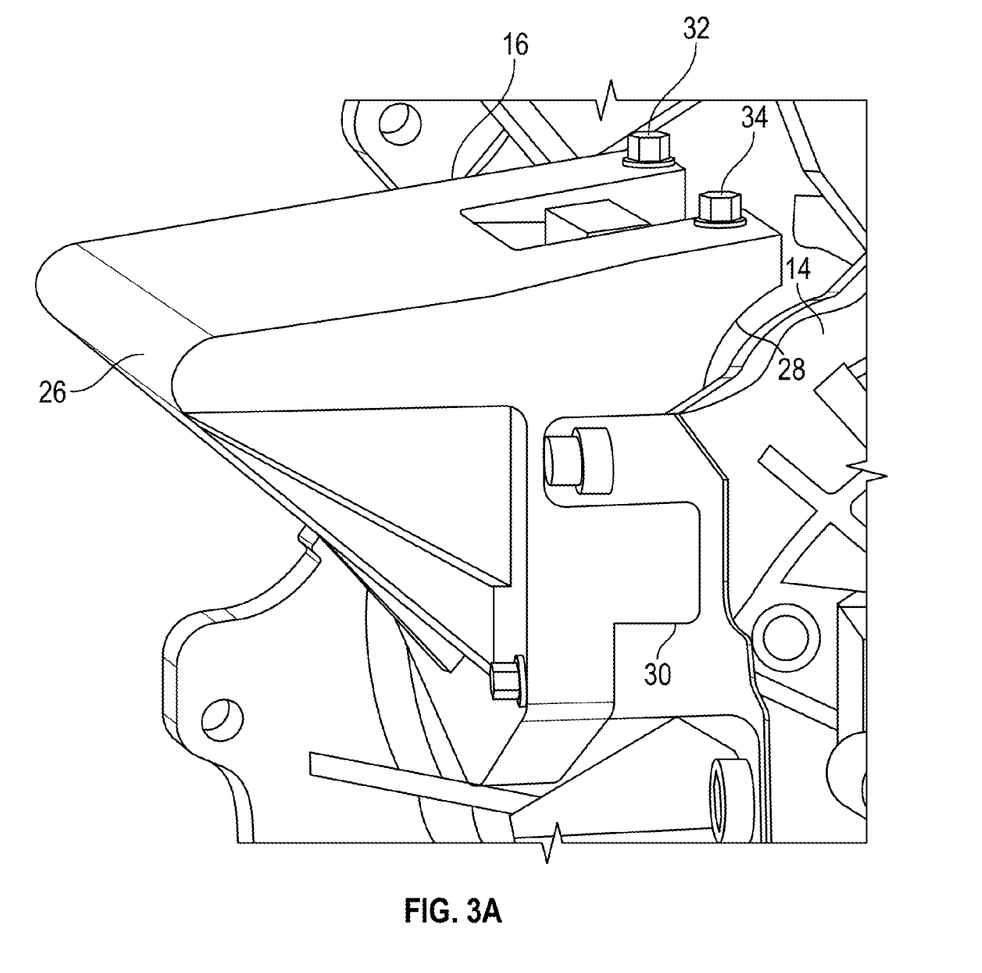
FIGS. 3A and 3B illustrate the interface between the roll initiator and the vehicle transmission.
Figure 3B:
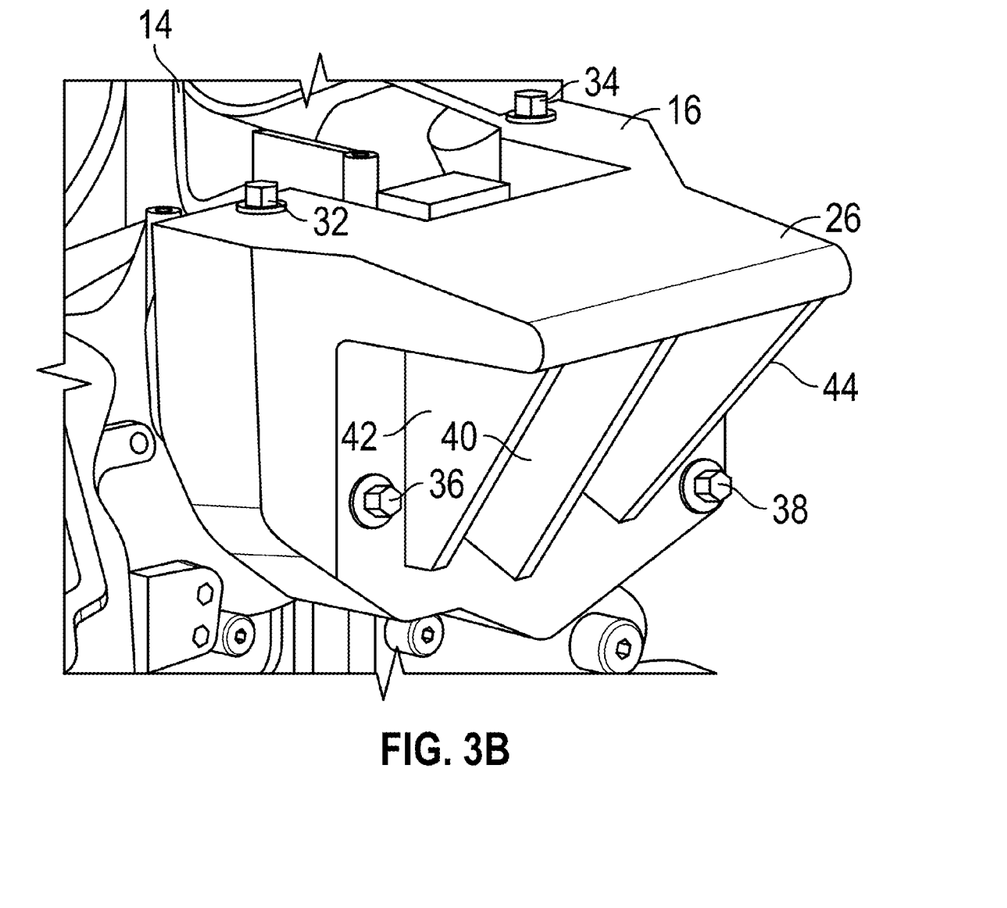

FIGS. 3A and 3B schematically show detailed views of the interface between the roll initiator and the vehicle transmission. Like reference numerals have been retained as appropriate.

In FIG. 3A, it can be seen that the roll initiator 16 comprises a projecting portion 26 which extends away from the transmission 14 towards the front of the vehicle in use. The rear surface of the roll initiator 16 comprises curved portions 28 and 30. These portions are shaped so as to correspond to the shape of the surface of the transmission 14 to which the roll initiator 16 is to be attached.

The shaped portions 28 and 30 increase the amount of surface area of the roll initiator 16 that contacts the transmission 14 when the roll initiator 16 is attached to the transmission. It is desirable to have as large a surface area of the roll initiator 16 as possible contact the transmission 14 as this in turn increases the efficiency of force transmission between the roll initiator 16 and the transmission 14. An efficient transmission of force corresponds to a greater degree of rotation of the transmission 14 during a collision which increases the chances of the hunchback region avoiding contact with the dash panel cross member 20 (see FIGS. 2A and 2B).

The rear surface of the roll initiator 16 also comprises a number of built in locking or catcher features (e.g. a hook portion). These are features which engage with projections or recesses in the surface of the transmission 14, and which inhibit the roll initiator 16 from rolling or sliding off the transmission 14 during a collision.

The roll initiator 16 is attached to the transmission 14 via first and second bolts 32, 34 that extend vertically through the roll initiator 16 and into the transmission 14.

In FIG. 3B it can be seen that the roll initiator 16 is also attached to the transmission 14 via third and fourth bolts 36, 38 that extend horizontally through the roll initiator 16 and into the transmission 14.

As can also be seen in FIG. 3B the roll initiator comprises a central rib 40 and a pair of lateral ribs 42, 44. The ribs 40, 42, 44 act to reinforce the projecting portion 26 and inhibit it from collapsing during a collision. If the projecting portion 26 were to collapse during a collision it may inhibit the efficient transmission of linear force of the roll initiator 16 into rotational force on the transmission 14. The ribs 40, 42, 44 also act to distribute the force experienced by the projecting portion 26 during a collision evenly through As is visible in FIGS. 3A and 3B, the roll initiator 16 is attached only to the transmission 14 itself. The roll initiator 16 requires no structural attachment fasteners to any other part of the engine compartment. Prior art methods of dissipating energy during a collision have used rigid rods connecting the engine or transmission to a deformable beam within the engine compartment. The present disclosure provides an improvement over such arrangements by providing a simplified construction. The present disclosure requires fewer components, and fewer points of attachment, which results in a quicker installation. Additionally, due to the form fitting shape of the rear surface of the roll initiator a sufficient strength of attachment can be achieved using a small number of fasteners. This can reduce cost compared with prior art constructions.

It will further be appreciated by those skilled in the art that although the disclosure has been described by way of example with reference to the embodiment above it is not limited to the disclosed embodiment and that alternative embodiments could be constructed without departing from the scope of the present disclosure as defined in the appended claims.

For example, while the exemplary embodiment shown in the Figures is a cast aluminium roll initiator, this need not be the case in practice and roll initiators according to the present disclosure can be made from any suitable material or by any suitable manufacturing process. For example, the roll initiator could be made of plastic, or could be a structure formed from sheet metal or bar/tube stock material.

As a further example, while the exemplary embodiment shown in the Figures comprises a roll initiator attached to the vehicle transmission using bolts, this could equally be achieved using studs and nuts, or external clamps/clips, as these fasteners are present merely to hold the roll initiator in place during normal operation of the vehicle.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The description of the disclosure is merely exemplary in nature and, thus, variations that do not depart from the substance of the disclosure are intended to be within the scope of the disclosure. Such variations are not to be regarded as a departure from the spirit and scope of the disclosure.

As used herein, the phrase at least one of A, B, and C should be construed to mean a logical (A OR B OR C), using a non-exclusive logical OR, and should not be construed to mean "at least one of A, at least one of B, and at least one of C.

What is claimed is:

1. A vehicle transmission apparatus for an automotive vehicle having a longitudinal axis and a lateral axis, the apparatus being disposed within an engine compartment of the vehicle, and the apparatus comprising:
    a vehicle transmission; and
    a roll initiator attached to the vehicle transmission at a location on the transmission that is above a center of mass of the transmission, the roll initiator being operable to rotate the vehicle transmission about the lateral axis of the vehicle, the roll initiator having a projecting portion that extends away from the transmission toward a front of the vehicle, wherein the projecting portion is arranged to come into contact with a structure within the engine compartment during a collision.

2. The vehicle transmission apparatus according to claim 1, wherein the roll initiator is aligned with a bumper beam of the vehicle.

3. The vehicle transmission apparatus according to claim 1, wherein a rear surface of the roll initiator comprises a portion corresponding in shape to an outer surface of the vehicle transmission.

4. The vehicle transmission apparatus according to claim 1, wherein the roll initiator comprises a hook portion configured to engage with a portion of the vehicle transmission.

5. The vehicle transmission apparatus according to claim 1, wherein the roll initiator and the vehicle transmission each comprise corresponding interlocking portions.

6. The vehicle transmission apparatus according to claim 1, wherein the projecting portion comprises one or more reinforcing ribs.

7. The vehicle transmission apparatus according to claim 1, wherein the vehicle transmission is a continuously variable transmission.

8. The vehicle transmission apparatus according to claim 1, wherein the vehicle transmission is a hybrid electric transmission.

9. A vehicle comprising:
the vehicle transmission apparatus of claim 1; and
a bumper, wherein the roll initiator is arranged between the bumper and the vehicle transmission.

10. The vehicle transmission apparatus according to claim 9, wherein the roll initiator is not structurally attached to any other part of the engine compartment or the bumper.

11. A method of modifying a vehicle transmission for an automotive vehicle having a longitudinal axis and a lateral axis, the vehicle transmission being contained within an engine compartment of the vehicle, the method comprising:
attaching a roll initiator to the vehicle transmission, wherein the roll initiator comprises a projecting portion that extends away from the transmission toward a front of the vehicle and is only structurally attached to the transmission, the projecting portion being arranged to come into contact with a structure within the engine compartment during a collision.

12. The method according to claim 11, wherein the vehicle transmission is a continuously variable transmission.

13. The method according to claim 11, wherein the vehicle transmission is a hybrid electric transmission.

14. A roll initiator for a vehicle transmission of a vehicle, the vehicle having a longitudinal axis and a lateral axis, the roll initiator comprising:
a first portion having a rear surface configured to be mounted to the vehicle transmission;
a projecting portion fixedly coupled to the first portion and extending away from the first portion and configured to come into contact with a structure within an engine compartment of the vehicle during a collision; and
a plurality of ribs, each rib of the plurality of ribs being attached to the first portion and the projecting portion and extending therebetween.

15. The roll initiator according to claim 14, wherein a portion of the rear surface is configured to correspond in shape to an outer surface of the vehicle transmission.

16. The roll initiator according to claim 14 further comprising a hook portion configured to engage with a portion of the vehicle transmission.

17. The roll initiator according to claim 14 further comprising an interlock portion configured to engage with a corresponding interlock of the vehicle transmission.

18. A vehicle transmission apparatus comprising:
a vehicle transmission, wherein the vehicle transmission is one of continuously variable transmission or a hybrid electric transmission; and
the roll initiator of claim 14, wherein the roll initiator is attached to the vehicle transmission.

19. The roll initiator according to claim 18, wherein the projection portion extends and aligns with a bumper beam of the vehicle.

20. The vehicle transmission apparatus according to claim 14 further comprising a first fastener and a second fastener, the first and second fasteners coupling the first portion to the vehicle transmission, the second fastener being transverse to the first fastener.

* * * * *